United States Patent
DePani et al.

(10) Patent No.: US 6,480,714 B1
(45) Date of Patent: Nov. 12, 2002

(54) CELLULAR DOCKING STATION

(75) Inventors: Sebastiano DePani, Atlanta, GA (US); Peter O. Roach, Jr., Memphis, TN (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 0 days.

(21) Appl. No.: 09/126,268

(22) Filed: Jul. 30, 1998

Related U.S. Application Data

(60) Provisional application No. 60/054,238, filed on Jul. 30, 1997.

(51) Int. Cl.[7] ................................................. H04Q 7/20
(52) U.S. Cl. ....................... 455/426; 455/560; 455/554; 455/11.1; 455/445
(58) Field of Search ................................ 455/557, 554, 455/426, 11.1, 33.1, 56.1, 33.2, 15, 560, 445; 379/59, 58, 63

(56) References Cited

U.S. PATENT DOCUMENTS

| | | | |
|---|---|---|---|
| 3,906,166 A | | 9/1975 | Cooper et al. |
| 4,268,722 A | | 5/1981 | Little et al. |
| 4,775,997 A | * | 10/1988 | West, Jr. et al. ............... 379/58 |
| 4,890,315 A | * | 12/1989 | Bendixen et al. ............. 379/59 |
| 5,430,719 A | | 7/1995 | Weisser, Jr. |
| 5,544,227 A | * | 8/1996 | Blust et al. .................... 379/63 |
| 5,703,933 A | * | 12/1997 | Ghisler ........................ 379/58 |
| 5,812,637 A | * | 9/1998 | Schornack et al. ........... 379/59 |
| 6,035,215 A | * | 3/2000 | Goni et al. .................. 455/557 |
| 6,078,805 A | * | 6/2000 | Scott .......................... 455/406 |

* cited by examiner

Primary Examiner—Thanh Cong Le
Assistant Examiner—Lana Le
(74) Attorney, Agent, or Firm—Kilpatrick Stockton LLP

(57) ABSTRACT

A system for communicating with the user of a cellular telephone via the cellular mobile radio (CMR) system and the public switched telephone network (PSTN). A communications interface appends the telephone exchange number of an outgoing communication to include an identifier unique to the communications interface. The outgoing communication is transmitted by the cellular telephone to the CMR system, which recognizes and verifies the outgoing communication as originating with the communications interface. Accordingly, the origination of the outgoing communication from a communications interface is documented prior to forwarding the outgoing communication to its intended recipient via the PSTN. Communications incoming to a communications interface are authenticated as such, and a record as to this is created, prior to forwarding the incoming communication to the cellular telephone.

18 Claims, 5 Drawing Sheets

CELLULAR DOCKING STATION

RELATED APPLICATION

The present application claims benefit under 35 U.S.C. §119(e) to Provisional Patent Application Serial No. 60/054,238, entitled "Cellular Docking Station", filed on Jul. 30, 1997.

FIELD OF THE INVENTION

This invention relates in general to telephonic communications and more particularly relates to cellular communications via a docking station.

BACKGROUND OF THE INVENTION

In recent years, the vast majority of the industrialized world has become telephonically accessible via public switched telephone networks (PSTNs). Nonetheless, there remain significant populations in rural or less developed areas who are not accessible via a PSTN for a variety of reasons relating to economy and geography. In such areas, remote communication has been accomplished by radio communications systems or cellular mobile radiotelephone (CMR) systems.

A conventional radio communications system uses a base station transceiver located at a site for favorable radio propagation and a set of transceivers typically located in remote areas. Most radio communication systems of this type are useful for conducting communications between short distances, such as within the boundaries of a town or city, via a very high frequency (VHF) radio link.

Although conventional radio communications systems are useful for specialized communications applications, two-way radios are not widely accepted for general purpose communications. In many locations, the use of two-way radios is governmentally regulated and the allocated frequency spectrum is relatively limited. Furthermore, the quality of communications is subject to the propagation conditions between communications sites. Additionally, two-way radio equipment is generally large and heavy and, as a result, is unlikely to be carried by a user at all times or to be installed in small or existing equipment.

Another form of two-way communication is a CMR system. Typical CMR systems are characterized by dividing a radio coverage area into smaller coverage areas or "cells" using low power transmitters and coverage-restricted receivers. As shown in U.S. Pat. Nos. 3,906,166 and 4,268,722, the limited coverage area enables the radio channels used in one cell to be reused in another cell. As a cellular mobile radiotelephone within one cell moves across the boundary of the cell and into an adjacent cell, control circuitry associated with the cells detects that the signal strength of the radio-telephone in the just-entered cell is stronger, and communications with the radiotelephone are "handed off" to the just-entered cell. Thus, a CMR system can supply two-way communications for an array of cells, thereby supplying communications for a much wider area than conventional two-way radios.

Use of cellular mobile radiotelephones can pose an appreciable expense to the user. Initially, a cellular mobile radio-telephone must be purchased and an initial registration fee paid to a cellular carrier providing service to the geographic area where the handset will be used. A telephone number is assigned to the newly purchased radiotelephone and a "handset I.D." is established by the carrier and maintained within the CMR system. The handset I.D. identifies communications from that particular radiotelephone as coming from a subscriber to the cellular carrier's services.

Beyond the initial purchase and cellular carrier connection fees, expenses incurred in ordinary use of such a radiotelephone are even more significant. Historically, every communication placed from a radiotelephone is processed through the CMR system without regard for the location of the radiotelephone when the call is placed. Such processing incurs a combination of usage fees and toll or roamer charges. These fees vary depending upon the location of the radiotelephone relative to the geographic coverage area of the cellular carrier's services subscribed to, as well as other time and geographic related variables. In a basic case, a radiotelephone user who subscribes to a cellular carrier's services in Atlanta and who places a call from within his area of geographical coverage to a party, also located in Atlanta and within the same geographical coverage area, would be assessed a fee for accessing the CMR system, in addition to a per minute usage fee. The same call placed from a conventional telephone linked directly to the PSTN would be deemed a "local call" and would typically generate no per call fees. In a more extreme case, the same subscriber to a cellular service having a geographical service area in Atlanta who is on vacation in Los Angeles and desires to use his radiotelephone to place a call from his hotel room to a restaurant across the street will incur roamer charges for accessing the CMR system outside of his carrier's geographical coverage area, a fee for relaying the call from Los Angeles back to his carrier's mobile switching center in the Atlanta area, a fee for relaying the call from Atlanta back to the restaurant across the street from the caller in Los Angeles, all in addition to a per minute usage fee. Again, had the subscriber placed this call from his hotel room to the restaurant across the street via a conventional telephone linked directly to the PSTN, the call would have been deemed "local" and would have incurred no carrier-related fees.

Until recently, individuals in areas without direct access to the PSTN but desiring telephonic capability were essentially limited to costly and inconvenient CMR systems. Some of the inconvenience of using a home-based radiotelephone have been addressed with the advent of so-called fixed wireless (FWL) systems. FWL systems typically comprise a conventional cellular telephone physically connected to one or more conventional telephone handsets within a discrete location, such as a residence or office. The FWL system allows the connected conventional telephone handsets to access the CMR system through the cellular telephone to which they are connected. Even FWL systems, though, allow virtually no freedom of movement for the user and do not resolve other problems typically associated with CMR systems, including high cost of operation.

Accordingly, there is a need to provide individuals who do not have access to the PSTN a way to communicate telephonically in a reliable and cost-efficient manner. Additionally, there is a need to adapt current FWL systems so as to facilitate the use of such systems in conjunction with existing PSTN elements. Furthermore, there is a need to develop safeguards sufficient to prevent individuals who do not subscribe to a wireless system from gaining unauthorized access to the system, regarding both incoming and outgoing communications.

SUMMARY OF THE INVENTION

The present invention allows individuals who do not have direct access to a PSTN to communicate from, and receive communication at, their homes or another predetermined fixed location telephonically in a convenient and inexpensive manner. More particularly, the preferred form of the present invention is accomplished by utilizing a communications interface in cooperation with elements found in typical cellular mobile radiotelephone (CMR) and fixed wireless (FWL) systems. The methodology of the present invention defines the interaction of the communications interface with the CMR and FWL systems to deliver communications through a PSTN conveniently and inexpensively. More particularly, the present invention allows a conventional telephone handset to communicate through a typical cellular telephone.

The communications interface comprises three basic elements which allow communication by conventional telephone handsets through the cellular telephone. The conventional telephone handsets are connected to a Telephony Support Unit (TSU) within the communications interface. The TSU is connected to a communications interface controller (CIC) which is, in turn, connected to a Mobile Telephone Interface Unit (MTIU). These components, in combination, perform the basic functions of the communications interface.

Specifically, a subscriber to a communications system which includes the communications interface for CMR and FWL systems initiates an outgoing communication from a telephone handset connected to the communications interface. The outgoing communication is passed to the communications interface via a standard telephone cable connected at one end to the telephone handset, and at its other end to the communications interface using a connector such as an RJ-11 type.

Upon delivery of the outgoing communication, the TSU receives the outgoing communication. If communications from telephone handsets are received by the TSU simultaneously, the TSU arbitrates the communications as to priority. In other words, the TSU determines which outgoing communication to accept based on priority. Following arbitration, the TSU provides notification to the originator of one of the outgoing communications of the unavailability of the communications interface to place that communication. The TSU then forwards the remaining outgoing communication to the CIC.

The CIC is connected to the TSU and, upon completion of the functions of the TSU specified above and forwarding of the outgoing communication to the CIC, the CIC receives the outgoing communication and determines whether a cellular telephone registered for operation with the communications interface is communicatively connected to the communications interface. For one aspect of the present invention, the cellular telephone must be physically connected to the communications interface to further process the outgoing communication. Alternatively, the communications interface can determine whether the cellular telephone is within a predetermined proximate range of the communications interface. If so, the outgoing communication is processed and ultimately transmitted to the cellular telephone which, in turn, transmits the outgoing communication via the CMR system.

If the CIC determines that the cellular telephone is not in communicative contact with the communications interface, an indication as such is originated by the CIC and forwarded back through the TSU to the telephone handset to inform the user. If, on the other hand, the CIC determines that the cellular telephone is in communicative contact with the communications interface and that the cellular telephone is neither already in use nor unavailable for any other reason, the CIC processes the outgoing communication. This process appends the telephone exchange number to which the outgoing communication is directed with an identifier unique to that particular communications interface. Once appended, the outgoing communication is forwarded via a suitable communications link to the MTIU.

The MTIU includes a physical interface for connection of the cellular telephone to the communications interface. The MTIU receives the forwarded outgoing communication from the CIC and passes it to the cellular telephone via any one of a number of well known interfaces, such as an RJ-11 connector, one portion of which is connected to the MTIU, and the mating portion of which is integral to the cellular telephone.

Once the outgoing communication is received indicating that the cellular telephone is in communicative contact with the communications interface, the MTIU forwards the outgoing communication, preceded by the appended telephone exchange number to which the outgoing communication is directed, to the cellular telephone. The cellular telephone receives the outgoing communication from the telephone handset through the communications interface, and awaits a "send event" recognizable to the cellular telephone as a command to "send" the outgoing communication. Once the "send event" occurs, the cellular telephone transmits the outgoing communication to the CMR system in a well known manner.

The CMR system receives and processes the outgoing communication in the manner of conventional cellular communication. During processing, the Mobile Switching Center (MSC) recognizes the identifier appended to the telephone exchange number as indicating that the outgoing communication originated from the communications interface. In response to this recognition, the MSC directs an authentication unit to verify the origin of the outgoing communication. In response to this instruction from the MSC, the authentication unit authenticates the outgoing communication in a known manner.

One authentication method is the "seed and response" type, in which the authentication unit transmits a numerical sequence to the communications interface. The communications interface, upon receipt of the numerical sequence, performs a predetermined, unique algorithmic function on the numerical sequence before transmitting back to the authentication unit the result of the manipulation of the number sequence (first manipulated number sequence). Concurrently, the authentication unit, which contains a database in which a list of subscribing communications interfaces and their unique algorithmic functions are maintained, determines the proper algorithmic function corresponding to the appendage to the telephone exchange number of the outgoing communication. The authentication unit then performs the proper algorithmic function on the same number sequence sent to the communications interface, resulting in a second manipulated number sequence.

If the authentication unit does not receive a response, or receives from the communications interface any response other than the first manipulated number sequence which matches the second manipulated number sequence, the authentication unit informs the MSC and the MSC routes the outgoing communication to its intended recipient via a telephone cable trunk allocated for use by non-users of the communications interface. If, on the other hand, the first and second manipulated number sequences match, the authentication unit indicates such to the MSC which, in turn, directs the outgoing communication to its intended recipient via a specially designated telephone cable trunk reserved for use by users of the communications interface. A record of the disposition of each authentication procedure, along with a record of which telephone cable trunk each outgoing communication was eventually routed to, is maintained within the CMR system.

Communications incoming to the CMR system are also distinguished based on whether the incoming communication is directed to a user of the communications interface. For example, telephone exchange numbers corresponding to users of the communications interface can be maintained in a database within the CMR system. Prior to forwarding the incoming communication to the selected cellular telephone, the telephone exchange number of the incoming communication is compared to telephone exchange numbers stored in the database.

If the telephone exchange number of the incoming communication corresponds to an entry in the database, the CMR system queries the cell site in which the selected cellular telephone is registered for operation as to whether the selected cellular telephone is presently located within that particular cell cite. If so, a record of the telephone exchange number of the incoming communication corresponding to the database entry, as well as the presence of the selected cellular telephone in its cell cite of registration, is created and maintained within the CMR system. Thereafter, the incoming communication is forwarded to the selected cellular telephone. This authentication can occur separately or in conjunction with an additional authentication step, such as the "seed and response" type.

If, on the other hand, either the telephone exchange number of the incoming communication does not correspond to a database entry indicating use of the communications interface or the selected cellular telephone is not within its cell site of registration, a separate record to this effect is created. The incoming communication is then forwarded to the selected cellular telephone. Upon receipt of the incoming communication by the selected cellular telephone, an indication is forwarded through the communications interface to the connected telephone handsets to permit either the selected cellular telephone or any connected telephone handset to respond to the incoming communication.

That the present invention and the preferred embodiments thereof overcome the drawbacks set forth above and accomplish the advantages of the invention set forth herein will become apparent from the detailed description, the appended claims and the drawings.

DETAILED DESCRIPTION

Figure 1:
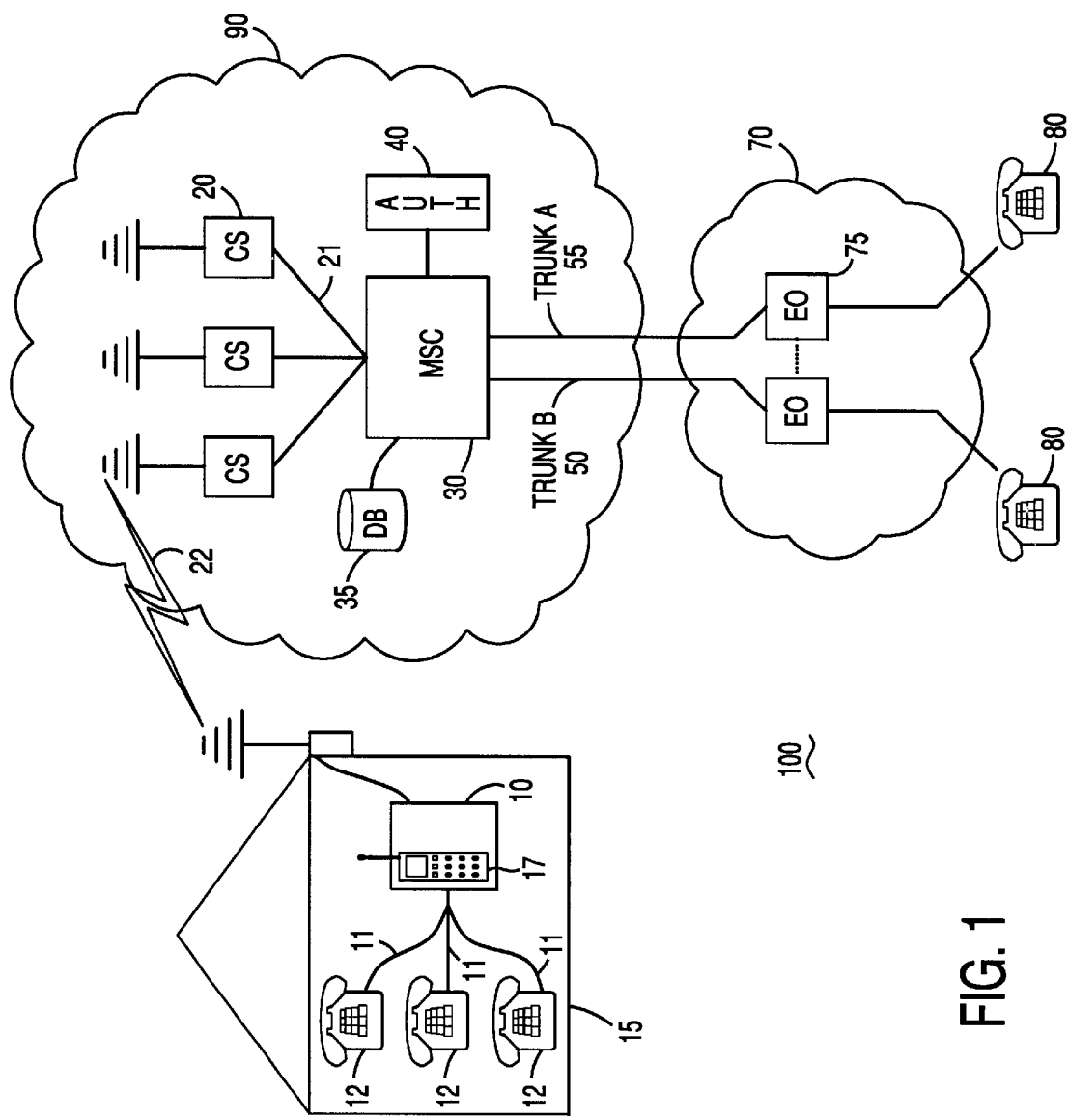
FIG. 1 is a block diagram illustrating the preferred environment for an exemplary embodiment of the present invention.

Referring now to the drawings, in which like numerals indicate like elements throughout the several figures, FIG. 1 is a block diagram illustrating the preferred environment of the present invention, which includes a method and an apparatus for telephonic communication in regions not communicatively accessible via a public switched telephone network (PSTN) alone. Stated generally, one embodiment of the present invention receives an outgoing communication from a conventional telephone handset, appends the communication with a unique identifier and transmits the outgoing communication via a cellular mobile radiotelephone (CMR) system to the PSTN for delivery to a called party by way of a specially designated telephone cable trunk.

Referring to FIG. 1, the communication system 100 operates in conjunction with the CMR system 90 so as to take advantage of an existing wide area communications network and to avoid the expense of communicating with each individual cellular user via a dedicated conventional telephone facility or conventional two-way radios. The communication system 100 adapts the existing environment of the CMR system 90 to communicate voice or data information via the PSTN 70 in a manner which had previously only been achievable through use of more burdensome and expensive communication means such as two-way radios or conventional cellular communication.

The CMR system 90 typically includes a radio coverage area divided into smaller coverage areas known as a "cells" using low power transmitters and coverage-restricted receivers. As will be known to those skilled in the art, the limited coverage area allows the radio channels used in one cell to be reused in another cell. As a mobile radiotelephone within one cell moves across the boundary of the cell and into an adjacent cell, control circuitry associated with the cells detects that the signal strength of the mobile radiotelephone in the just-entered cell is stronger, and communications with the mobile radiotelephone are "handed off" to the just-entered cell. A plurality of cells are typically provided in a conventional cellular service operator's system. Conventional CMR systems typically comprise at least one mobile telephone switch coupled to an appropriate array of more or less identically equipped cell sites. Each cell site can contain at least one mobile switching center (MSC) 30, which normally couples telephone conversations involving mobile radiotelephones operating in the cell to a public switched telephone network (PSTN) 70 or to other radiotelephones operating within the CMR system 90.

The PSTN 70 included in an exemplary embodiment of the communications system 100 includes Advanced Intelligent Network (AIN) elements as described generally in U.S. Pat. No. 5,430,719 to Weisser, Jr., which is incorporated by reference herein. Elements taught therein should be regarded as elements of the PSTN 70. For the purpose of the discussion of the present invention, it is noted that PSTN 70 includes a plurality of communicatively connected end offices 75 accessible by the CMR system 90. A communication can be initiated via the PSTN 70 by connection to the end offices 75 by a variety of devices 80 such as telephones and facsimile machines.

Communication between the typical CMR system 90 and the cells is accomplished through a plurality of mobile telephone switching offices, such as the MSC 30. The MSC 30 can communicate with a particular cell by a communications link 21 to a cell site 20. A communication from either the PSTN 70 or CMR system 90 is received by the MSC 30. In response, the MSC 30 relays the communication to one or more cell sites 20 in which a radiotelephone 17 of the intended recipient of the communication was last registered. Transmission of the communication from the cell site 20 to the radiotelephone 17 occurs via communications link 22.

For simplification of illustration, one MSC 30 along with its associated cell sites 20 will be used as an example to illustrate the operation of the communication system.

Figure 2:
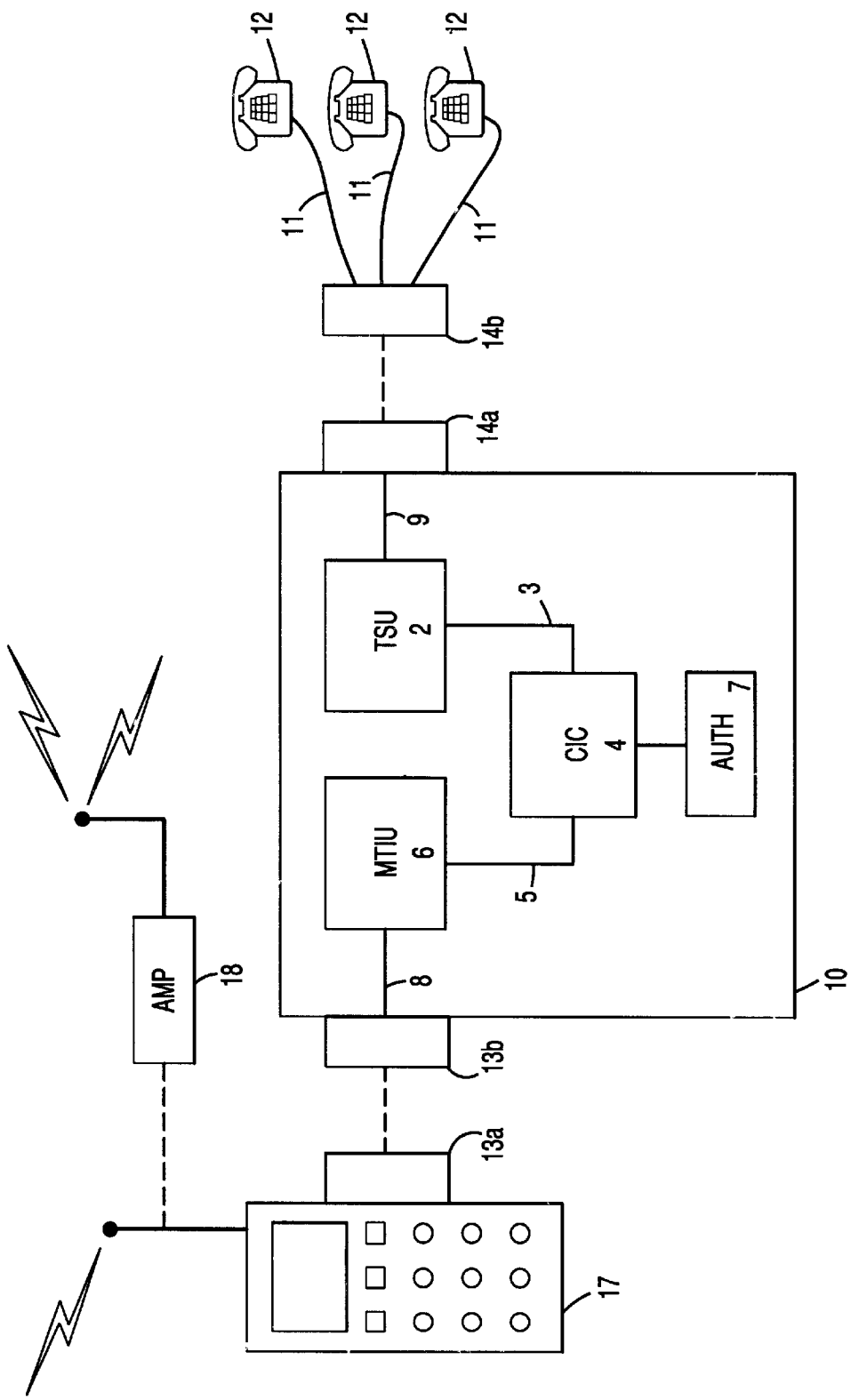
FIG. 2 is a block diagram illustrating a communications interface of an exemplary embodiment of the present invention.

The communication system can be activated by an individual desiring to place an outgoing communication from a home 15 by picking up a conventional telephone handset 12. The telephone handset 12 is connected, by typical telephone wiring 11, to a communications interface 10, located within the home 15. The connection between telephone wiring 11 and communications interface 10 is completed by use of any suitable connector, illustrated by mating connector portions 14*a* and 14*b* of FIG. 2. Preferably, connectors 14*a* and 14*b* are capable of accommodating transfer of voice and data signals, such as an RJ-11 type.

Upon receipt of the outgoing communication by communications interface 10 via connectors 14*a* and 14*b*, communications link 9 delivers the outgoing communication to a telephone support unit (TSU) 2.

The TSU 2 determines whether the outgoing communication is the only communication outgoing from the various connected telephone handsets 12 via telephone wiring 11. If more than one outgoing communication is essentially simultaneously received by the TSU 2, the TSU 2 arbitrates priority between concurrent outgoing communications, with priority given to the first-placed outgoing communication. Telephone handsets 12 from which subsequent outgoing communications were attempted are notified by the TSU 2 of the unsuccessful completion of their attempted outgoing communication.

Upon completion of this arbitration process, TSU 2 forwards the outgoing communication to a communications interface controller (CIC) 4, also located within the communications interface, via a communications link 3.

The CIC 4 receives the outgoing communication and first determines whether the cellular telephone 17 registered for operation with the communications interface 10 is communicatively connected to the communications interface 10. In this embodiment of the present invention, the communications interface 10 acts as a cellular docking station. Accordingly, the cellular telephone 17 must be physically connected to the communications interface 10 for the processing of the outgoing communication to continue. The determination as to whether the cellular telephone 17 is so connected occurs when the CIC 4 sends a verification signal through a communications link 5 to a mobile telephone interface unit (MTIU) 6, which relays the verification signal to an external connector portion 13*b*. When the cellular telephone 17 and communications interface 10 are physically connected, the connection occurs via mating connector portions 13*a* and 13*b*. Connector portion 13*a* is integral to the cellular telephone 17, and opposing connector portion 13*b* is integral to the communications interface 10. The verification signal sent by the CIC 4 detects whether mating connector portions 13*a* and 13*b* are mated and informs the CIC 4 accordingly.

Alternatively, physical connection between the cellular telephone 17 and the communications interface 10 is not necessary. Rather, the communications interface 10 is capable of operation through the cellular telephone 17 if the cellular telephone 17 is within close geographical proximity to the communications interface 10. In this embodiment, the CIC 4 determines whether the cellular telephone 17 is in close geographical proximity in a known manner such as detecting a periodic signal emanating from the cellular telephone 17, which periodic signal is only detectable at relatively short range. Another typical method of detection is accomplished by the CIC 4 transmitting, via a low power transmitter, a query to the cellular telephone 17. Upon receipt of the query from the CIC 4, the cellular telephone 17 responds, thereby indicating its presence in the geographical proximity defined by the broadcast range of the transceiver.

If the cellular telephone 17 is located so as to be in communicative contact with the communications interface 10, a further inquiry by the CIC 4 is made of the cellular telephone 17 to determine if the cellular telephone 17 is already in use. If the cellular telephone 17 is either not in communicative contact with the communications interface 10 or is currently in use, an indication to that effect is relayed back to the telephone handset 12 from which the outgoing communication originated.

If, on the other hand, the cellular telephone 17 is both communicatively accessible to the communications interface 10 and not currently in use, the CIC 4 appends the telephone exchange number to which the outgoing communication is directed to include an identifier unique to the particular communications interface 10. The CIC 4 then forwards the outgoing communication, preceded by the appended telephone exchange number, to the MTIU 6 via communications link 5. In the event that the outgoing communication originates with the cellular telephone itself, rather than the telephone handset 12, the telephone exchange number to which the outgoing communication is intended is similarly appended to include the unique identifier by routing the outgoing communication through the CIC 4 prior to transmission. The MTIU 6 then forwards the outgoing communication to the cellular telephone 17 via communication link 8 and mating connector portions 13*a* and 13*b*.

The cellular telephone 17 receives the outgoing communication and transmits the outgoing communication upon the occurrence of any one of two events. First, the outgoing communication may be transmitted upon activation of a "send" button or other manually activated key or sequence of keys on the keypad of the cellular telephone 17. This method of transmission can be used when the outgoing communication originates with the cellular telephone 17 rather than the telephone handset 12. Second, when the outgoing communication is originated by the telephone handset 12, the cellular telephone 17 will transmit the outgoing communication in response to the occurrence of a "send event". One such "send event" occurs upon the passage of a predetermined period of time following entry of the last digit of the telephone exchange number to which the outgoing communication is directed. Alternately, the cellular telephone will transmit the outgoing communication after a predetermined number of telephone exchange number digits have been entered through the keypad of the telephone handset 12.

In either case, during such passive initiation of the transmission of the outgoing communication by the cellular telephone 17, safeguards will insure that inadvertent transmissions are minimized. For instance, the period of time between keypad entry of the last digit of a telephone exchange number and attempted transmission of the outgoing communication would be such that an individual who pauses while dialing a number will usually not result in transmission of the outgoing communication. Similarly, logic internal to the CIC 4 of the communications interface 10 will differentiate between local, long distance domestic and long distance international calls, among others, which may require entry of a different number of digits from the keypad of the telephone handset 12.

In response to the occurrence of an event which triggers the transmission of the outgoing communication from the cellular telephone 17, examples of which are described above, the cellular telephone 17 transmits the outgoing communication to the CMR system in the manner of conventional cellular communications. In an alternate embodiment of the present invention, an amplifier 18 is connected to the output port of the cellular telephone 17 to provide greater range of transmission.

Referring back to FIG. 1, the CMR system 90 first receives the outgoing communication from the cellular telephone 17 at a cell site 20 in which the cellular telephone 17 is operating. The cell site 20 then forwards the outgoing communication to the MSC 30 via communications link 21. Upon receipt of the outgoing communication by the MSC 30, a determination is made as to whether the outgoing communication originated from a communications interface 10. First, the MSC 30 examines the telephone exchange number to which the outgoing communication is directed for the unique appendage which was added by the CIC 4 of the communications interface 10. The presence of the unique appendage indicates that the outgoing communication originated with a communications interface 10. If the unique appendage exists, the MSC 30 verifies the validity of the appendage by checking the appendage against a list of valid appendages maintained in a database 35, which is accessible by the MSC 30.

If the appendage to the telephone exchange number to which the outgoing communication is directed is not listed in the database 35 of valid appendages, the outgoing communication is routed to the public switched telephone network 70 via a telephone cable trunk 50. If, on the other hand, the appendage to the telephone exchange number to which the outgoing communication is directed corresponds to a valid appendage in the database 35, the MSC prompts an authentication unit 40 to perform an additional verification that the outgoing communication originates from a communications interface 10. The additional verification can be of the "seed and response" type, in which the authentication unit 40 transmits a numerical sequence to the communications interface 10. The communications interface 10, upon receipt of the numerical sequence, performs a predetermined algorithmic function on the numerical sequence before relaying back to the authentication unit 40 the result of the manipulation of the number sequence by the algorithmic function (first manipulated number sequence). Concurrently, the authentication unit 40, which contains a database in which a list of subscribing communications interfaces and their unique algorithmic functions are maintained, determines the proper algorithmic function corresponding to the appendage to the telephone exchange number of the outgoing communication. Thereafter, it performs the proper algorithmic function on the same number sequence sent to the communications interface 10, resulting in a second manipulated number sequence.

If the authentication unit 40 does not receive a response, or receives from the communications interface 10 any response other than the first manipulated number sequence which matches the second manipulated number sequence, the authentication unit 10 informs the MSC 30. The MSC 30 then routes the outgoing communication to its intended recipient via the telephone cable trunk 50, allocated for use by non-users of the communications interface. If, on the other hand, the first and second manipulated number sequences match, the authentication unit 40 has verified the outgoing communication as one which originated from a communications interface 10. The authentication unit 40 indicates such to the MSC 30 which, in turn, directs the outgoing communication to its intended recipient via a specially designated telephone cable trunk 55 reserved for use by users of the communications interface 10. A record of the disposition of each authentication procedure, along with a record of which telephone cable trunk each outgoing communication is routed to, is maintained within the CMR 90.

Communications incoming to the cellular telephone 17 through the CMR system 90 are also distinguished based on whether the incoming communication is directed to a user of the communications interface 10. In one embodiment, all telephone exchange numbers corresponding to users of a communications interface are maintained in the database 35 within the CMR system 90. An incoming communication, originating from a telephone handset 80 within the PSTN 70, is relayed from an end office 75 to the CMR system 90 via telephone trunk cables, such as 50 or 55. The incoming communication is received by the MSC 30 and the telephone exchange number to which the incoming communication is directed is compared to a list of telephone exchange numbers stored in database 35. The telephone exchange numbers in the database 35 correspond to authorized users of the communications interface 10. If the telephone exchange number to which the incoming communication is directed matches an entry in the database 35, the MSC 30 prompts the authentication unit 40 to perform a "seed and response" authentication, as discussed in conjunction with outgoing communications, above.

In the event that the seed and response authentication indicates that the incoming communication is directed to the authorized user of a communications interface 10, the MSC will query the cell sites 20 as to the particular cell in which the cellular telephone 17 is currently located. If, following successful authentication, the selected cellular telephone 17 is currently located within the particular cell site in which it is registered for operation and is available to receive the incoming communication, a record of the incoming communication is created and maintained within the CMR system 90. Information reflecting the successful authentication is also included in the record of the incoming communication. Thereafter, the incoming communication is forwarded to the selected cellular telephone 17.

If, on the other hand, either the telephone exchange number of the incoming communication does not correspond to a database entry indicating use of the communications interface 10, the seed and response authentication does not match, or the selected cellular telephone 17 is not available or within its cell site of registration, a separate record to this effect is created.

Upon receipt of the incoming communication by the selected cellular telephone 17, an indication is forwarded through the communications interface 10 to the connected telephone handsets 12 such that the incoming communication may be responded to by either the selected cellular telephone 17 or any connected telephone handset 12.

Figure 3A:
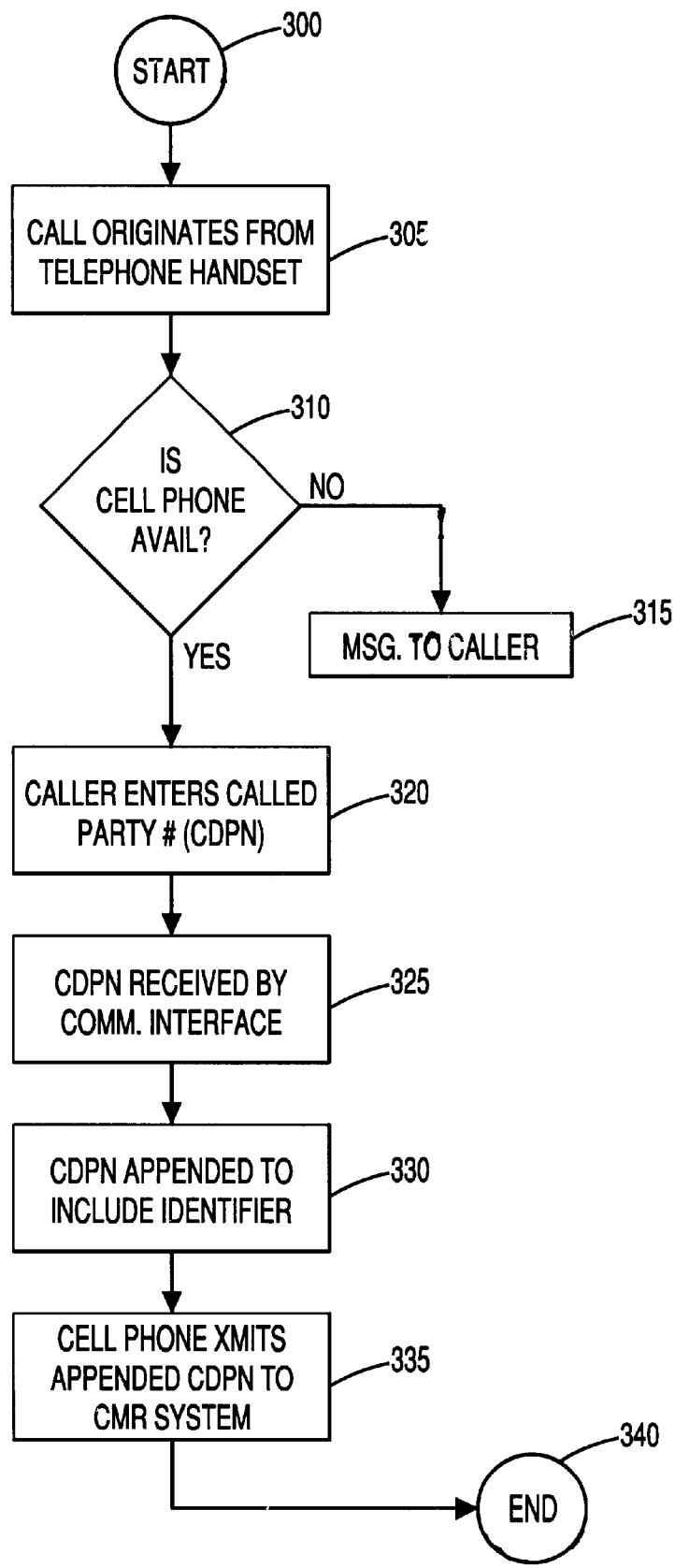
FIGS. 3A and 3B are flow charts illustrating a method of sending an outgoing communication pursuant to an exemplary embodiment of the present invention.

FIG. 3A is a flow chart diagram that shows steps for a method of communicating an outgoing communication through a communications interface 10 through the CMR system 90 and the PSTN 70. Referring to FIG. 3A, the method starts at step 300 and, at step 305, the outgoing communication originates from the telephone handset 12. At step 310, a determination is made as to whether the cellular telephone 17 programmed for operation with the communications interface 10 is communicatively connected to the communications interface 10 and is not already in use. If the cellular telephone 17 is either not communicatively connected to the communications interface 10 or is currently in use, a message to that effect is provided to the individual attempting the outgoing communication (caller), as shown in step 315.

If, on the other hand, the cellular telephone 17 is both communicatively connected to the communications interface 10 and is not already in use, an indication to that effect is similarly provided to the caller. The caller then, responsive to the signal indicating the availability of the cellular telephone 17, enters the telephone exchange number of the individual to whom the outgoing communication is directed (CdPN), as shown in step 320. Step 325 shows the CdPN received by the communications interface, where it is then appended to include the identifier unique to that particular communications interface 10, shown in step 330. Once the CdPN has been appended, the outgoing communication, preceded by the appended CdPN, is transmitted to the CMR system 90 in a manner well known to those skilled in the art.

Figure 3B:
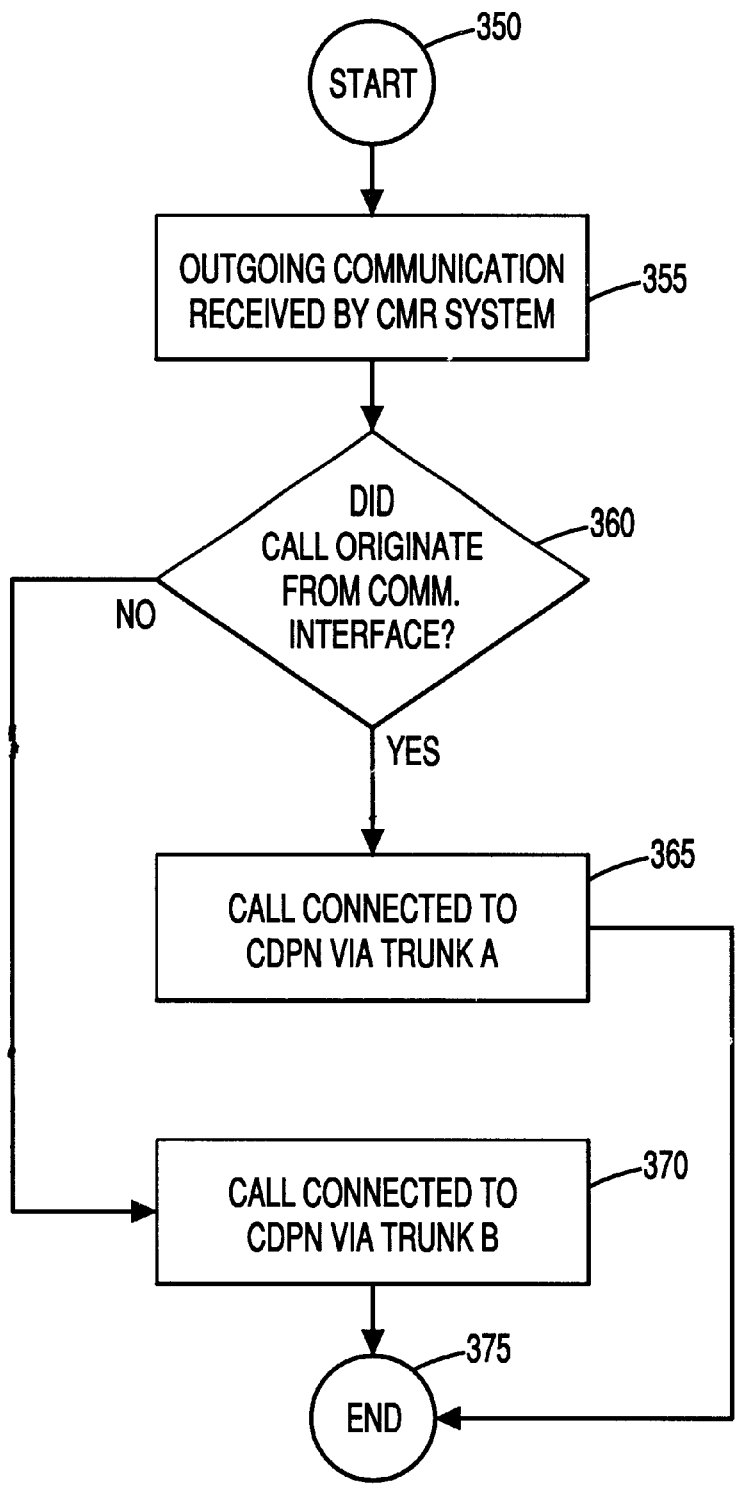

FIG. 3B is a flow chart diagram demonstrating steps for a method of processing a communication, originating with an exemplary embodiment of the present invention, through the CMR system 90. Referring to FIG. 3B, the method starts at step 350 and, at step 355, the outgoing communication (preceded by the appended CdPN) is received by the CMR system 90. The outgoing communication is first received by one of a plurality of individual cell sites 20 connected by communications links 21 to the MSC 30. Upon receipt of the outgoing communication by the MSC 30, the authentication process shown generally at step 360 is performed.

More particularly, the authentication process of step 360 requires the MSC 30 to compare the telephone exchange number from which the outgoing communication originated to telephone exchange numbers of authorized users of the communications interface 10, which numbers are maintained in the database 35 internal to the CMR system 90. If the telephone exchange number from which the outgoing communication originated is verified as an authorized user of a communications interface 10, a seed and response authentication is then performed to further reduce the chance of fraudulent use of the system. Such authentication is performed by the authentication unit 40, which is communicatively connected to the MSC 30. If both authentication steps are completed and indicate that the caller is an authorized user of a communications interface 10, the outgoing communication is relayed to the CdPN via telephone cable trunk 55, as shown in step 365. On the other hand, if authentication is not successfully completed, the outgoing communication is relayed to the CdPN via telephone cable trunk 50, as shown in step 370. The method of connection of an outgoing telephonic communication from the MSC 30 within the CMR system 90 through the PSTN 70 to a particular CdPN 80 is well known to those skilled in the art.

Figure 4:
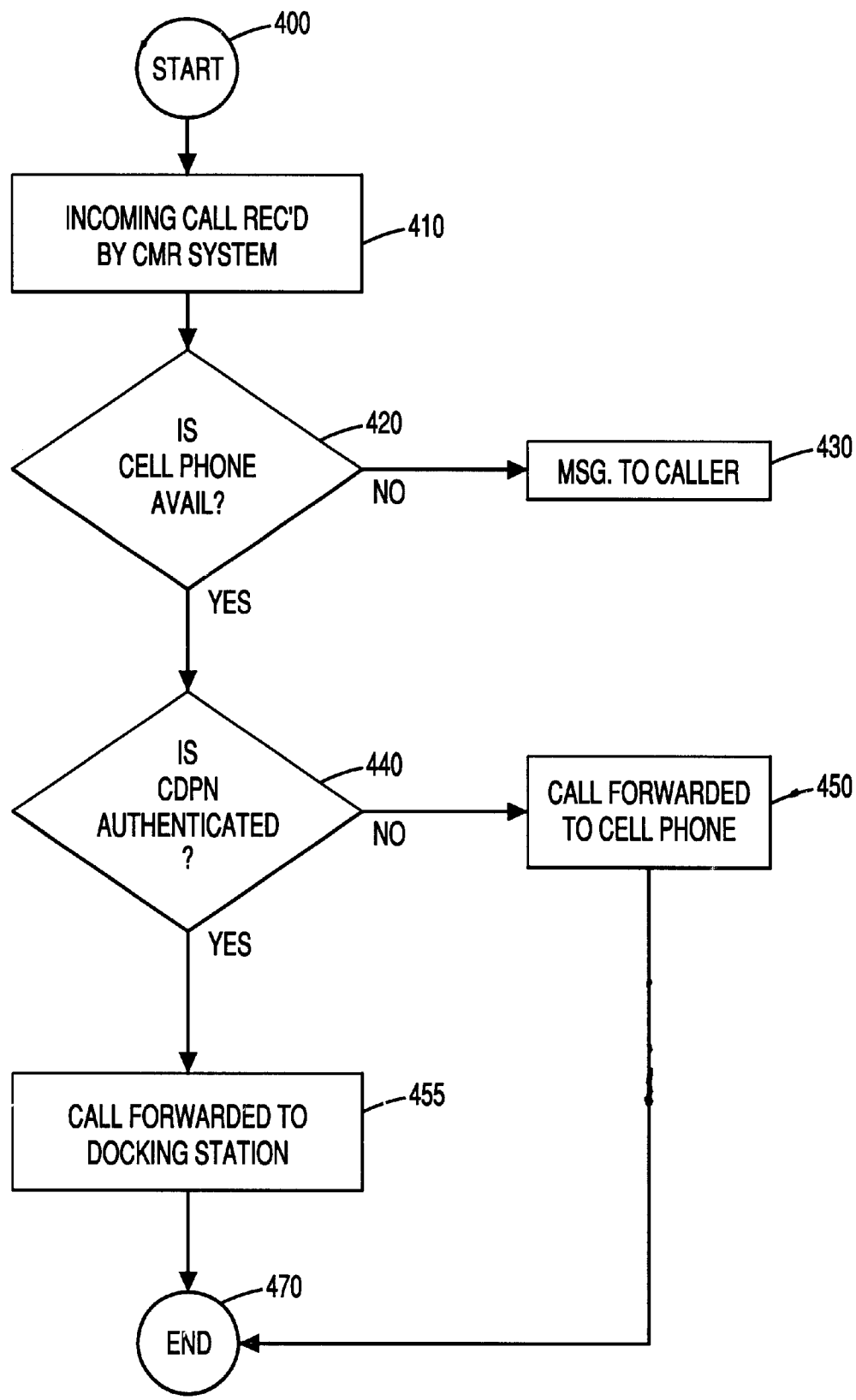
FIG. 4 is a flow chart illustrating a method of receiving an incoming communication by an exemplary embodiment of the present invention.

FIG. 4 is a flow chart diagram that shows steps for a method of processing an incoming communication to a user of a communications interface 10. Referring to FIG. 4, the method starts at step 400 and, at step 410, an incoming communication is received by the CMR system 90. The incoming communication is then forwarded to the MSC 30, where the availability of the cellular telephone 17 to receive an incoming communication is determined by a query transmitted through communications links 21 to cell sites 20 and, thereafter, to the cellular telephone 17. Decision block 420 depicts alternate courses of action depending on the availability of cellular telephone 17. If cellular telephone 17 is not available to receive the incoming communication, a message to that effect is returned to the originator of the call, as shown in step 430.

If, however, the cellular telephone is available to receive the incoming communication, a further inquiry is made to determine whether the intended recipient of the incoming communication is an authorized user of the communications interface 10, shown at step 440. The inquiry consists of two parts. First, the MSC 30 compares the telephone exchange number to which the incoming communication is intended to a list of telephone exchange numbers registered for use with a communications interface, which list is maintained in database 35. If the telephone exchange numbers match, a seed and response authentication procedure, explained above, is performed. Successful completion of both aspects of the authentication process result in forwarding the incoming communication to the cellular telephone in a manner well known to those skilled in the art, as depicted in step 455. Otherwise, an appropriate notation of the failure of the authentication process is made in the database 35 of the CMR system 90 prior to forwarding the incoming communication to the cellular telephone 17.

In summary, the present invention allows individuals who do not have direct access to a PSTN 70 to communicate from, and receive communication at, their homes or another predetermined fixed location telephonically in a convenient and inexpensive manner. This is accomplished by utilizing a communications interface 10 in cooperation with elements found in typical CMR and FWL systems. More particularly, the communications interface 10 provides a communicative link between the conventional telephone handset 12 and the cellular telephone 17 utilizing the TSU 2, CIC 4 and MTIU 6. Importantly, authorized users of the communications interface 10 can be identified as such by the CMR system 90. Once an individual originating an outgoing communication or receiving an incoming communication is identified as an authorized user, the communication to or from that individual can be treated accordingly by the CMR system 90.

While the invention has been described in detail with respect to specific embodiments thereof, it will be appreciated that those skilled in the art, upon attaining an understanding of the foregoing, may readily conceive of alterations to, variations of and equivalents to these embodiments. Accordingly, the scope of the present invention should be assessed as that of the appended claims and any equivalents thereto and not limited to the specific embodiments articulated hereinabove.

We claim:

1. A communication system comprising:
   a cellular mobile radiotelephone (CMR) system having a mobile switching center (MSC) and a plurality of cellular telephones; and
   a communications interface for allowing a conventional telephone handset to access the CMR system via a selected cellular telephone, wherein the communications interface comprises
   means for determining whether the selected cellular telephone is in communicative contact with the communications interface;
   means for transferring communication signals between the telephone handset and the selected cellular telephone, wherein means for transferring comprises
   a mobile terminal interface unit (MTIU) for delivering and receiving communication signals between the communications interface and the selected cellular telephone,
   a telephony support unit (TSU) for delivering and receiving communication signals between the communication interface and the telephone handset, and
   a controller connected to the MTIU and TSU for controlling the exchange of communication signals; and means for supplying an indication to the CMR system that the selected cellular telephone is operating through the communications interface, wherein communication signals initiated by the telephone handset are routed through the controller and the MTIU to the selected cellular telephone and, thereafter, transmitted as an outgoing communication, and whereby an incoming communication is received by the selected cellular telephone, routed through the communicatively connected MTIU and control unit to the TSU, at which point the incoming communications may be answered by the conventional telephone handset connected thereto.

2. The communication system of claim 1 wherein the MTIU is further operative to detect the selected cellular telephone when it is proximate to but disconnected from the communications interface and to relay the detection of the selected cellular telephone to the controller, thereby enabling use of the telephone handset for initiating communications signals.

3. A communication system comprising:

a cellular mobile radiotelephone (CMR) system having a mobile switching center (MSC) and a plurality of cellular telephones; and a communications interface for allowing a conventional telephone handset to access the CMR system via a selected cellular telephone, wherein the communications interface comprises means for determining whether the selected cellular telephone is in communicative contact with the communications interface;

means for transferring communication signals between the telephone handset and the selected cellular telephone, wherein means for transferring comprises
a mobile terminal interface unit (MTIU) for delivering and receiving communication signals between the communications interface and the selected cellular telephone,
a telephony support unit (TSU) for delivering and receiving communication signals between the communication interface and the telephone handset, and
a controller connected to the MTIU and TSU for controlling the exchange of communication signals; and means for supplying an indication to the CMR system that the selected cellular telephone is operating through the communications interface, wherein the transfer means comprises the MTIU and the controller, the MTIU is operative to detect the connection of the selected cellular telephone to the communications interface, and to relay the detected connection to the controller, thereby enabling use of the traditional telephone handset for initiating the communication signals.

4. A communication system comprising:

a cellular mobile radiotelephone (CMR) system having a mobile switching center (MSC) and a plurality of cellular telephones; and a communications interface for allowing a conventional telephone handset to access the CMR system via a selected cellular telephone, wherein the communications interface comprises means for determining whether the selected cellular telephone is in communicative contact with the communications interface;

means for transferring communication signals between the telephone handset and the selected cellular telephone; and means for supplying an indication to the CMR system that the selected cellular telephone is operating through the communications interface, wherein the indicating means is operative to append an identifier that identifies an outgoing communication as originating from the communication interface.

5. A communication system comprising:

a cellular mobile radiotelephone (CMR) system having a mobile switching center (MSC) and a plurality of cellular telephones; and a communications interface for allowing a conventional telephone handset to access the CMR system via a selected cellular telephone, wherein the communications interface comprises means for determining whether the selected cellular telephone is in communicative contact with the communications interface;

means for transferring communication signals between the telephone handset and the selected cellular telephone; and means for supplying an indication to the CMR system that the selected cellular telephone is operating through the communications interface, wherein the MSC identifies incoming communications intended for subscribers to the communications interface by comparing the telephone exchange number for the incoming communication to a list of subscribers maintained in a database and, if identified as one of the listed subscribers and if the selected cellular telephone is proximate to the communications interface and available to receive the incoming communication, then delivering the incoming communication to the selected cellular telephone.

6. The communication system of claim 5 wherein the identification is performed by a Home Station Authentication Unit (HSAU), which authenticates the telephone exchange number to which the incoming communication is directed as a subscriber to the communication interface system.

7. A communication system comprising:

a cellular mobile radiotelephone (CMR) system having a mobile switching center (MSC) and a plurality of cellular telephones; and a communications interface for allowing a conventional telephone handset to access the CMR system via a selected cellular telephone, wherein the communications interface comprises means for determining whether the selected cellular telephone is in communicative contact with the communications interface;

means for transferring communication signals between the telephone handset and the selected cellular telephone; and means for supplying an indication to the CMR system that the selected cellular telephone is operating through the communications interface, wherein the MSC identifies incoming communications intended for subscribers to the communications interface by comparing the telephone exchange number for the incoming communication to a list of subscribers maintained in a database and, if identified as one of the listed subscribers and if the selected cellular telephone is located within the cell site in which the selected cellular telephone is registered for operation and available to receive the incoming communication, then delivering the incoming communication to the selected cellular telephone.

8. A communication system comprising:
a cellular mobile radiotelephone (CMR) system comprising a mobile switching center (MSC) and a plurality of cellular telephones, and
a communications interface for allowing a telephone handset to access the CMR system via a selected one of the cellular telephones by identifying an attempted outgoing communication originating from the communicatively connected telephone handset, determining whether the selected cellular telephone associated with the communications interface is connected to the communications interface,
in the event that the selected cellular telephone is connected to the communications interface, information including the telephone exchange number to which the outgoing communication is directed (called party number) is relayed from the telephone handset to a Telephony Support Unit (TSU) within the communications interface for processing, thereafter, the outgoing communication is routed to a controller where an identifier which identifies the outgoing communication as originating from the communications interface is appended to the called party number, thereafter, the outgoing communication is forwarded to the Mobile Terminal Interface Unit (MTIU), where it is delivered to the selected cellular telephone, which selected cellular telephone then initiates the outgoing communication via the CMR system.

9. The communication system of claim 8 wherein the communications interface is operative to identify its selected cellular telephone when the selected cellular telephone is proximate to but disconnected from the communications interface, and is further operative to communicate communication signals to and from the selected cellular telephone.

10. The communications system of claim 8 wherein the CMR system recognizes the identifier appended to the called party number as indicating origination of the outgoing communication from the communications interface and, in response, transfers the outgoing communication to a selected telephone cable trunk, which transfer is restricted by an authentication means.

11. The communications system of claim 8 wherein incoming communications to subscribers to the communications system are identified as such by authentication unit within the CMR system upon comparison of the telephone exchange number to which the incoming communication is directed to a list of subscribers maintained in a database and, if identified as a subscriber and if the selected cellular telephone is proximate to the communications interface and available to receive the incoming communication, the incoming communication is delivered to the selected cellular telephone.

12. The communications system of claim 8 wherein incoming communications to subscribers to the communications system are identified as such by the CMR system upon comparison of the telephone exchange number to which the incoming communication is directed to a list of subscribers maintained in a database and, if identified as a subscriber and if the selected cellular telephone is located within the cell site in which the selected cellular telephone is registered for operation and is available to receive the incoming communication, the incoming communication is delivered to the selected cellular telephone.

13. A method of communicating a telephone call initiated by a telephone handset via a cellular mobile radiotelephone (CMR) system, comprising the steps of:
responsive to initiation of an outgoing communication from the telephone handset, determining whether a cellular telephone is connected to a communications interface, which communications interface passes outgoing communications from the telephone handset to the cellular telephone,
in the event that the cellular telephone is connected to the communications interface:
accepting the outgoing communication from the telephone handset at the communications interface,
appending the outgoing communication with an identifier indicating that the outgoing communication is initiated by the communications interface,
providing the appended outgoing communication to the cellular telephone, and
transmitting the appended outgoing communication from the cellular telephone to the CMR system.

14. The communications method of claim 13, further comprising the steps of:
in the event that the cellular telephone is not connected to the communications interface, determining whether the cellular telephone is within close geographical proximity to the communications interface and, if so, forwarding the outgoing communication to the cellular telephone.

15. The communications method of claim 13, further comprising the steps of:
the CMR system identifying the outgoing communication as originating from the communications interface, then
directing the identified outgoing communication to a selected telephone cable trunk of a Public Switched Telephone Network (PSTN) reserved for users of the communications interface.

16. A method of communicating a telephone call to a telephone handset via a cellular mobile radiotelephone (CMR) system, the method comprising the steps of:
responsive to receipt of an incoming communication by the CMR system, first determining whether the intended recipient of the incoming communication is a subscriber to a communications interface by checking a database within the CMR system;
then determining whether a selected cellular telephone is connected to the communications interface; and
in the event that the cellular telephone is connected to the communications interface, transmitting the incoming communication from the CMR system to the cellular telephone,
wherein the first determining step further comprises the steps of:
an authentication unit within the CMR system sending a number sequence to the communications interface;
the communications interface performing a predetermined algorithm on the number sequence;
the authentication unit performing the same predetermined algorithm on the same number sequence; and
comparing the two number sequences.

17. A method of communicating a telephone call to a telephone handset via a cellular mobile radiotelephone (CMR) system, the method comprising the steps of:
responsive to receipt of an incoming communication by the CMR system, first determining whether the intended recipient of the incoming communication is a subscriber to a communications interface by checking a database within the CMR system;

then determining whether a selected cellular telephone is connected to the communications interface; and in the event that the cellular telephone is connected to the communications interface, transmitting the incoming communication from the CMR system to the cellular telephone, wherein the second determining step identifies the selected cellular telephone when the selected cellular telephone is physically connected to the communications interface.

18. A method of communicating a telephone call to a telephone handset via a cellular mobile radiotelephone (CMR) system, the method comprising the steps of:

responsive to receipt of an incoming communication by the CMR system, first determining whether the intended recipient of the incoming communication is a subscriber to a communications interface by checking a database within the CMR system;

then determining whether a selected cellular telephone is connected to the communications interface; and in the event that the cellular telephone is connected to the communications interface, transmitting the incoming communication from the CMR system to the cellular telephone, wherein the second determining step identifies the selected cellular telephone when the selected cellular telephone is in close geographical proximity to the communications interface.

* * * * *